(12) United States Patent
Soltner et al.

(10) Patent No.: US 11,584,276 B2
(45) Date of Patent: Feb. 21, 2023

(54) HEADREST FOR A VEHICLE SEAT AND ASSOCIATED SEAT

(71) Applicant: Faurecia Sièges d'Automobile, Nanterre (FR)

(72) Inventors: Stéphane Soltner, Mailleroncourt-Charette (FR); Anthony Maire, Montbeliard (FR); Benjamin Eller, Paris (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/243,492

(22) Filed: Apr. 28, 2021

(65) Prior Publication Data

US 2021/0339666 A1    Nov. 4, 2021

(51) Int. Cl.
*B60N 2/879* (2018.01)
*B60N 2/885* (2018.01)

(52) U.S. Cl.
CPC ............ *B60N 2/879* (2018.02); *B60N 2/885* (2018.02)

(58) Field of Classification Search
CPC ............................... B60N 2/879; B60N 2/885
See application file for complete search history.

(56) References Cited

U.S. PATENT DOCUMENTS

| | | | |
|---|---|---|---|
| 4,027,112 A | | 5/1977 | Heppner et al. |
| 5,133,017 A | * | 7/1992 | Cain ................ G10K 11/17881 381/71.4 |
| 5,687,246 A | * | 11/1997 | Lancon ............... B60R 11/0217 381/338 |
| 6,744,898 B1 | * | 6/2004 | Hirano ................... H04R 5/023 381/301 |
| 7,162,048 B2 | * | 1/2007 | Shima .................... H04R 1/025 381/334 |
| 9,326,072 B2 | * | 4/2016 | Tse .......................... H04R 5/02 |
| 11,128,949 B2 | * | 9/2021 | Chang ...................... H04R 7/14 |
| 2010/0086145 A1 | * | 4/2010 | Setiabudi ............. H04R 1/2834 381/86 |
| 2016/0257227 A1 | * | 9/2016 | Takada ................ B60R 11/0217 |
| 2017/0106775 A1 | * | 4/2017 | Takada ................. H04R 1/2819 |
| 2017/0210257 A1 | * | 7/2017 | Kondrad ................... B60N 2/70 |
| 2019/0215606 A1 | * | 7/2019 | You ......................... B60N 2/879 |
| 2020/0189436 A1 | * | 6/2020 | Soltner ................. H04R 5/023 |

FOREIGN PATENT DOCUMENTS

DE    10241132 A1    3/2004

OTHER PUBLICATIONS

French Search Report corresponding to French Application No. FR 2004280, dated Dec. 21, 2020, 2 pages.

* cited by examiner

*Primary Examiner* — Philip F Gabler
(74) *Attorney, Agent, or Firm* — Reising Ethington P.C.

(57) ABSTRACT

A headrest for a vehicle seat includes: a support surface for the head of an occupant; at least one lateral edge extending along an edge of the support surface; and a sound diffusion system arranged in a cavity in the edge and including a speaker configured to emit sound waves in front of the support surface and at least one passive radiator configured to emit low frequency sound waves in front of the support surface.

10 Claims, 5 Drawing Sheets

HEADREST FOR A VEHICLE SEAT AND ASSOCIATED SEAT

TECHNICAL FIELD

The present invention relates to a headrest for a vehicle seat.

The invention also relates to a seat comprising such a headrest.

The invention also relates to a vehicle comprising such a seat.

BACKGROUND

The vehicle is, in particular, a motor vehicle. However, the invention also applies to an air, rail, or sea vehicle.

In particular, the invention relates to the diffusion of sounds to an occupant of the seat, such as music, audible warnings or a telephone call. For this purpose, it is known to place a loudspeaker in the headrest of the seat in order to broadcast these sounds.

However, the structure of the headrests does not allow for a large cavity to provide good quality sound, especially due to the limited space available and design constraints.

In particular, the loudspeakers are not capable of properly diffusing sound in the low frequencies, especially below 200 Hz.

In order to allow this sound diffusion in the low frequencies, it is known to have a tube-shaped vent called a "Bass-Reflex" tube in the cavity that also receives the loudspeaker.

However, the sound produced is not entirely satisfactory, especially due to sound distortion.

SUMMARY

One of the objects of the invention is then to compensate for this inconvenience by proposing a headrest allowing better quality sound diffusion, in particular in the low frequencies.

To this end, the invention relates to a headrest for a motor vehicle seat, comprising a support surface intended to receive the head of an occupant, the support surface defining a main orientation, from the rear towards the front, substantially perpendicular to the support surface, from the support surface towards the outside of the headrest; at least one side edge extending along a side edge of the support surface and defining with the support surface a space for receiving the occupant's head; the side edge defining a cavity, the headrest including a sound diffusion system arranged in the cavity, the sound diffusion system comprising: a loudspeaker configured to emit sound waves outwardly from the cavity, into the receiving space, in front of the support surface, the loudspeaker comprising a first diaphragm and an exciter capable of directly exciting the first diaphragm and varying the air pressure in the cavity; and at least one passive radiator configured to emit low-frequency sound waves out of the cavity into the receiving space in front of the support surface, the passive radiator being separate from the loudspeaker and comprising a second membrane, the second membrane being adapted to be excited by pressure variations in the cavity.

When the loudspeaker is in operation and the exciter vibrates the first diaphragm at a certain frequency, the movement of the first diaphragm creates variations in air pressure in the cavity and causes the second diaphragm to move. The second diaphragm then resonates, especially at low frequencies, and compensates for the loss of speaker efficiency at these frequencies.

In addition, the movement of the first diaphragm is damped by the energy absorbed by the second diaphragm, flattening the frequency response and thus achieving accurate sound reproduction and reduced distortion.

Finally, the sound system is arranged in the side edges and the diffused sound is directed towards the head of the seat occupant, which allows the sound to be diffused as close as possible to the ears of the occupant, thus improving the perception of sound by the occupant.

Depending on other advantageous aspects of the invention, the headrest includes one or more of the following features, considered alone or according to all technically possible combinations:

- each side edge extends forward in the principal orientation with respect to the support surface.
- the loudspeaker and/or the at least one passive radiator are, at least in part, arranged in a front part of the side edge, the front part being located in front of the support surface according to the main orientation.
- the headrest comprises two side edges extending on either side of the support surface, each side edge defining a cavity, the headrest comprising two sound diffusion systems each disposed in one of the cavities.
- the sound diffusion system comprises two passive radiators, notably arranged on either side of the loudspeaker according to a direction of elevation perpendicular to the main orientation.
- the first diaphragm has a first surface, and each second diaphragm has a second surface, the ratio between the sum of the second surfaces and the first surface being between 1.5 and 2.
- the first diaphragm presenting a larger dimension of between 3 cm and 6 cm.
- each second diaphragm presenting an oblong shape; and
- each side edge is movable relative to the side edge of the support surface along which the said side edge extends.

The invention also relates to a motor vehicle seat comprising at least one headrest as described above.

The invention also relates to a motor vehicle seat comprising at least one seat as described above.

BRIEF DESCRIPTION OF THE DRAWINGS

Other aspects and advantages of the invention will appear when reading the following description, given as an example and with reference to the appended drawings, in which.

DETAILED DESCRIPTION

Figure 1:
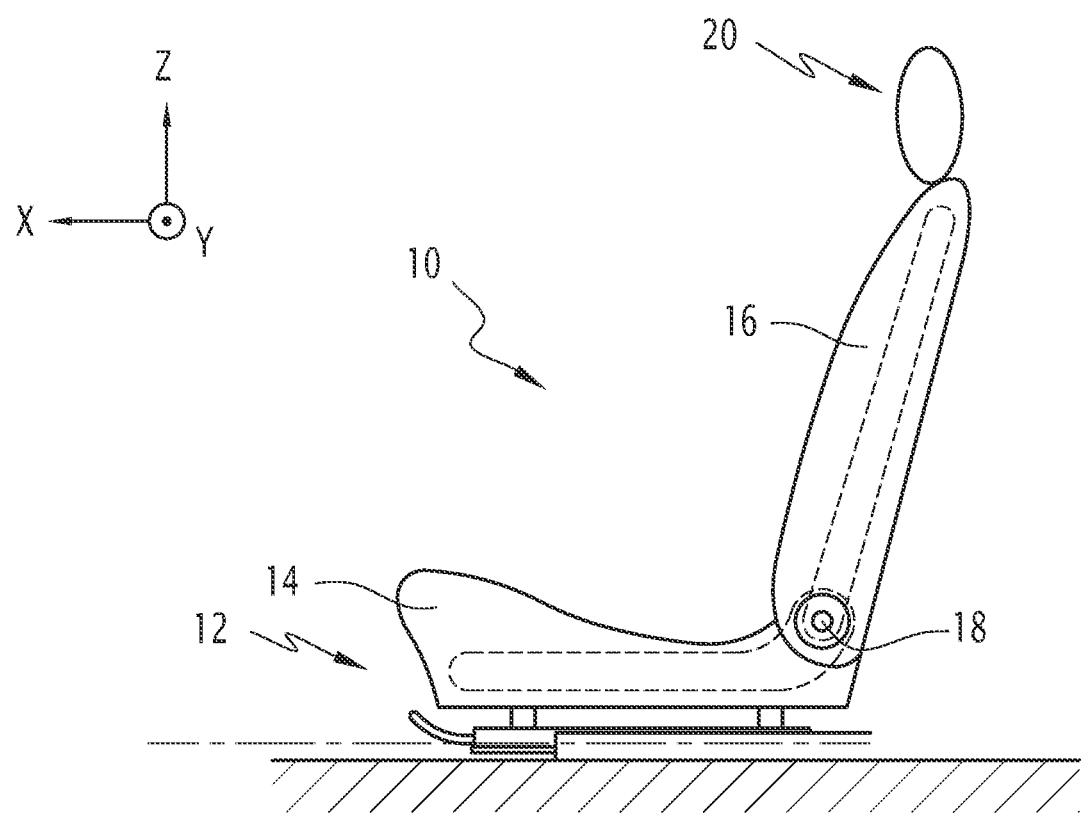
FIG. 1 is a schematic side view of a seat according to an embodiment of the invention.

A seat 10 according to an embodiment of the invention is shown schematically in FIG. 1.

The seat 10 is adapted to be placed in the passenger compartment of a motor vehicle and to accommodate an occupant 11.

Alternatively, the seat 10 is arranged in an air, rail or sea vehicle.

The seat 10 defines a longitudinal direction X-X' identical to the longitudinal direction of the vehicle in which the seat 10 is mounted. This longitudinal direction X corresponds to the normal direction of travel of the vehicle and to the length of the vehicle.

The seat 10 also defines a transversal direction Y-Y' corresponding to a direction perpendicular to the normal direction of travel of the vehicle and to the width of the vehicle.

The seat 10 also defines a direction of elevation Z-Z', perpendicular to the longitudinal X-X' and transversal Y-Y' directions and corresponding to the height of the vehicle.

For example, the seat 10 is mounted on a slide mechanism 12 which allows the seat position to be adjusted in the longitudinal direction X-X'.

As can be seen in FIG. 1, the seat 10 has a seat pan 14 on which a backrest 16 is mounted, usually pivoting about an axis 18.

The seat 10 also includes a headrest 20.

The headrest 20 is intended to be mounted in a moveable manner on the backrest 16 so that the head of occupant 11 in the seat 10 can rest on the headrest 20 when the occupant is seated on the seat pan 14 with his or her back resting against the backrest 16.

In particular, the headrest 20 is attached to two rods 21 that slide in two corresponding sleeves in the backrest 16, the height of the headrest 20 being adjustable in the direction of elevation Z-Z' by sliding the rods 21 into the sleeves.

Figure 2:
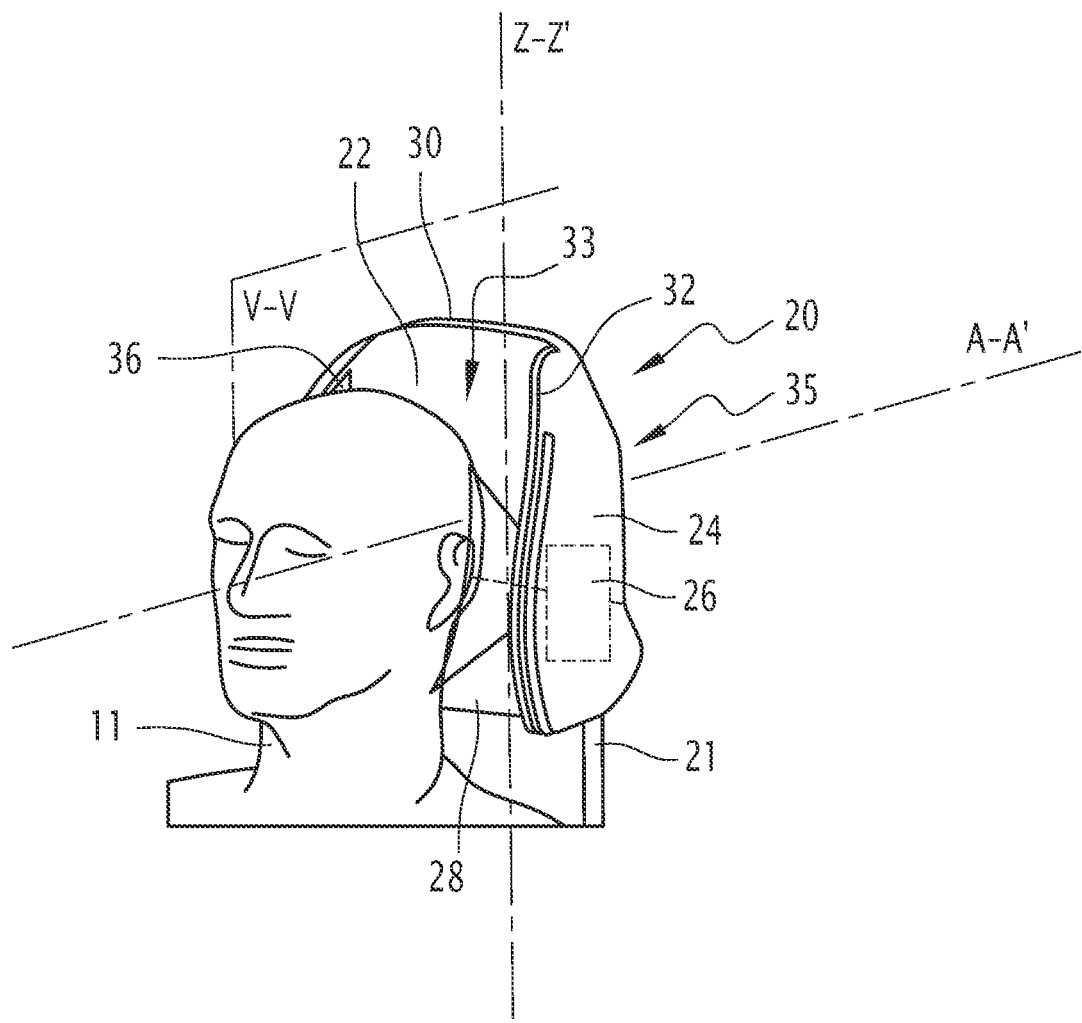
FIG. 2 is a perspective view, from the front, of a headrest mounted on the seat in FIG. 1.

As can be seen in FIG. 2, the headrest 20 comprises a support surface 22, at least one side edge 24 and at least one sound diffusion system 26.

The support surface 22 is intended to receive the head 11 of the occupant.

The support surface 22 defines a principal orientation A-A', substantially perpendicular to the support surface 22, from the support surface 22 to the exterior of the head restraint 20.

Thus, the forward direction corresponds, for example, to the direction of travel of the vehicle when the seat 10 is facing the front of the vehicle.

Perpendicular to the support surface 22 means perpendicular to a flat portion of the support surface 22 against which the head of the occupant 11 is applied. If the support surface 22 is fully curved, the principal orientation is perpendicular to the plane tangential to the support surface 22 at the deepest area of the curvature of the support surface 22.

The principal orientation A-A' extends according to the direction in which the seat 10 is oriented, for example, a direction substantially parallel to the longitudinal direction X-X' of the seat 10 for a forward-facing seat 10.

Each support surface 22 comprises edges defining the periphery of the support surface 22. In particular, the support surface 22 comprises a lower edge 28 and an upper edge 30, spaced from each other in the direction of elevation Z-Z', and connected to each other by the side edges 32 extending in the direction of elevation Z-Z' on either side of the support surface 22.

Each side edge 24 extends along an edge 32 of the support surface 22.

In particular, the headrest 20 comprises two side edges 24 extending on either side of the support surface 22.

The side edges 24, together with the support surface 22, define a reception space 33 for receiving the head of the occupant 11.

As seen in FIG. 2, each side edge 24 extends forward according to the main orientation A-A' relative to the support surface 22.

Each side edge 24 extends from the support surface 22 to a front edge in the principal orientation A-A'.

Thus, the side edge 24 comprises a rear part in contact with the support surface 22 and a front part located in front of the support surface 22 according to the main orientation A-A' and including the front edge.

In particular, the front part is located at a distance of more than 1 cm from the support surface 22 according to the main orientation A-A'.

In particular, the front part extends substantially from the center of the side edge 24, according to the main orientation A-A', to the front edge.

In the embodiment shown in FIG. 2, each side edge 24 is fixed relative to the support surface 22.

Figure 3:
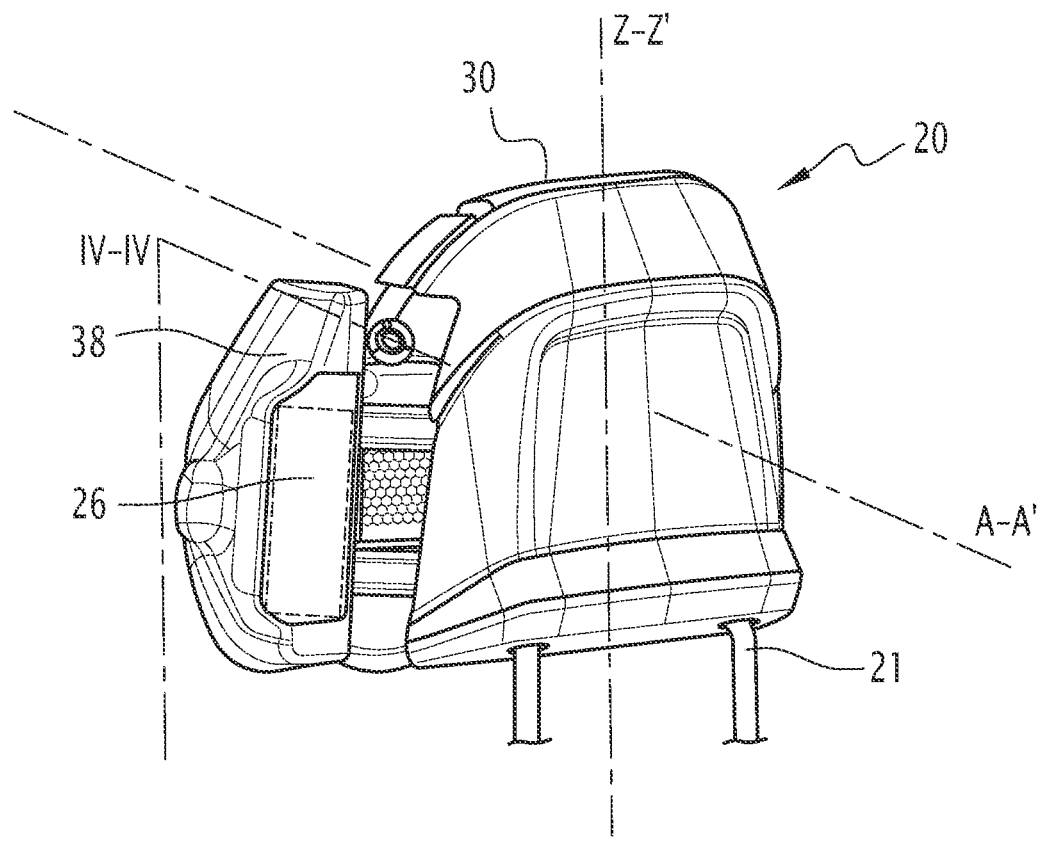
FIG. 3 is a perspective view, from behind, of a headrest mounted on the seat of FIG. 1, according to another embodiment.

Alternatively, as shown in FIG. 3, each side edge 24 is movable relative to the support surface 22.

For example, each side edge 24 is movable in rotation relative to the edge 32 of the support surface 22 along which the said side edge 24 extends.

Rotation of the side edge 24 relative to the support surface 22 makes it possible to change the orientation of the side edge 24 relative to the support surface 22 and thus to change the orientation of the sound diffusion system 26 relative to the occupant 11, as will be explained later, and to change the volume of the reception space 33.

Alternatively, the side edge 24 can be moved in translation according to the transverse direction Y-Y' relative to the support surface 22.

The translation of the side edge 24 in relation to the support surface 22 allows the side edge 24 to be moved away from or closer to the support surface 22 and thus to adapt the position of the sound diffusion system 26 relative to the occupant 11 and to modify the volume of the reception space 33.

Alternatively, the side edge 24 can be moved in a combined movement of rotation relative to the edge 32 and transversal translation.

Thus, the side edge 24, and consequently the sound diffusion system 26, adapts to the morphology of the occupant 11 in the seat 10.

Such mobility allows the sound diffusion system 26 to be placed closer to the ears of the occupant 11 and thus improve their perception of the diffused sounds.

Each side edge 24 defines at least one cavity, not referenced.

The cavity is airtight to the outside air.

As an example, the cavity 24 presents [has] a volume of 0.2 L.

In particular, the side edge 24 includes a lining element 35 forming the walls forming the side edge 24 and delimiting the cavity.

The individual walls are glued or welded together, with, for example, additionally a seal between the walls to ensure that the cavity is sealed. The seal is, in particular, made of rubber.

The lining element 35 is made of fabric or leather, for example.

The walls comprise at least one front wall 36, facing the reception space 33 of the head of the occupant 11 and extending the support surface 22, and a rear wall 38, opposite the front wall 36 and facing the outside of the seat 10.

The cavity thus extends into the interior volume of the side edge 24, i.e., into the thickness of the side edge between the front wall 36 and the rear wall 38.

The cavity opens into an emission surface of the side edge 24 formed by at least part of the front wall 36.

The person skilled in the art will understand that the cavity includes air and possibly foam to allow the passage of air.

Each sound diffusion system 26 is placed in the cavity.

In particular, the headrest 20 includes two sound diffusion systems 26 each arranged in one of the cavities.

Figure 4:
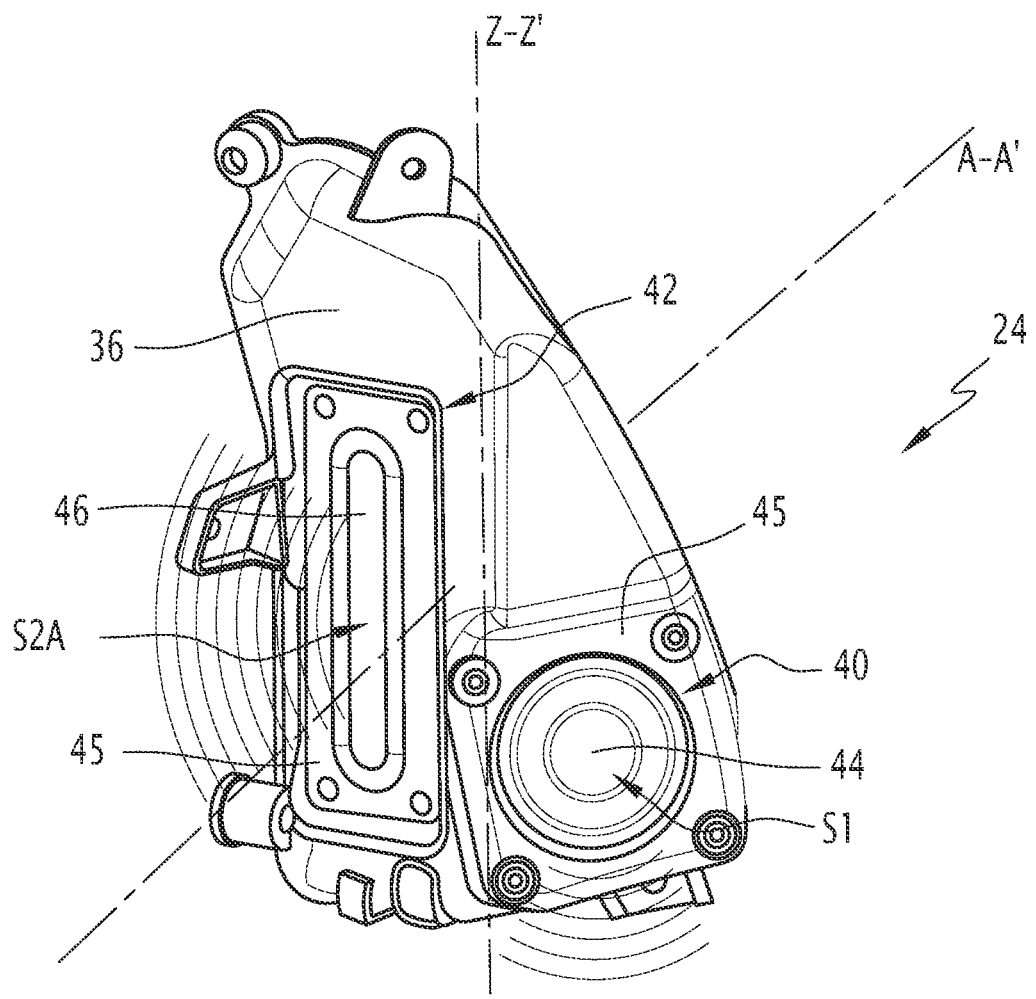
FIG. 4 is a sectional view along axis IV-IV of the side edge of the headrest in FIG. 3.
Figure 5:
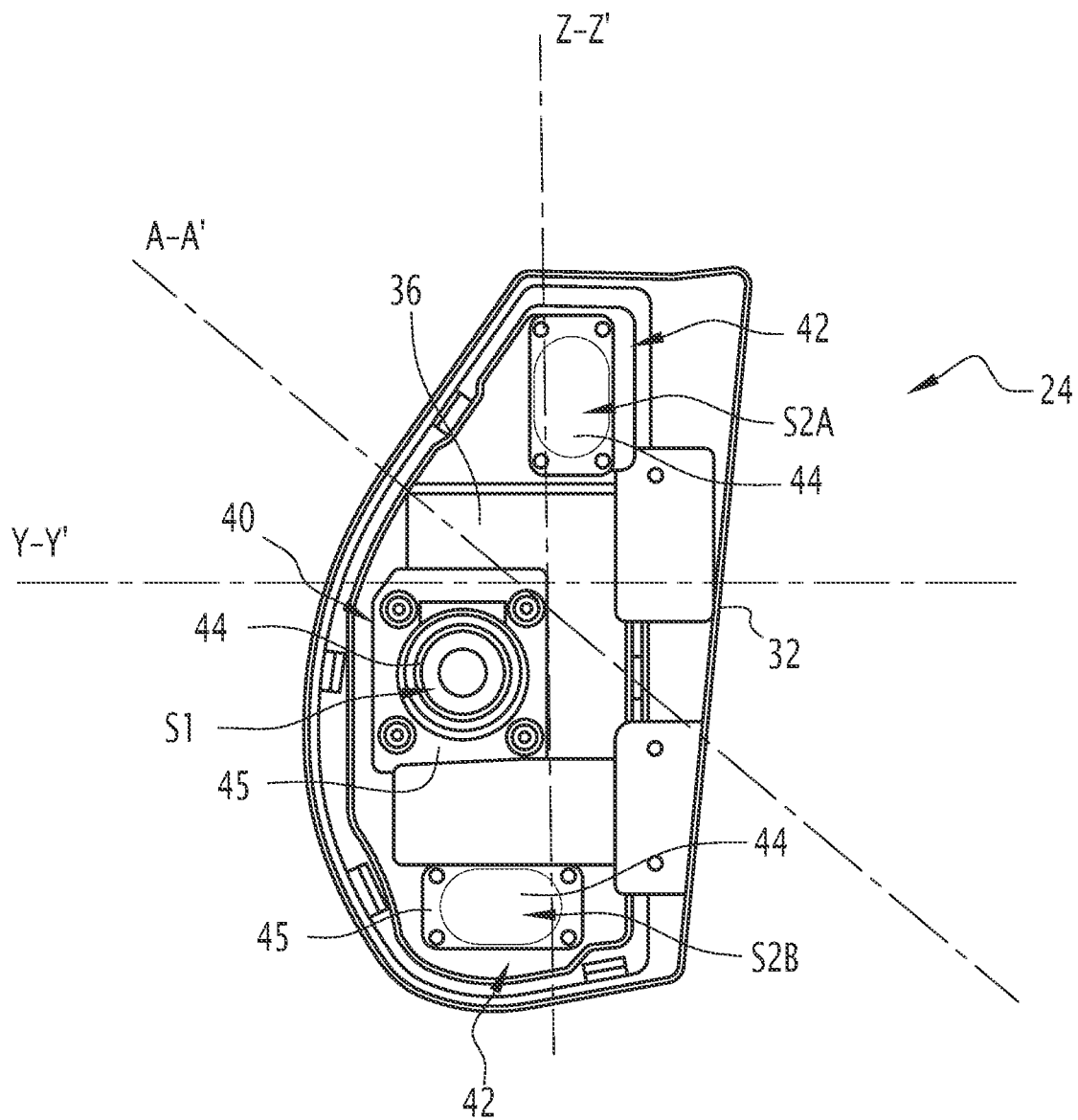
FIG. 5 is a sectional view along the V-V axis of the side edge of the headrest in FIG. 2, according to another embodiment.

As can be seen in FIGS. 4 and 5, each sound diffusion system 26 has a loudspeaker 40 and at least one passive radiator 42.

The loudspeaker 40 is configured to emit sound waves to the reception space 33, in front of the support surface 22, i.e., towards the occupant 11.

The loudspeaker 40 is arranged, at least in part, in the front part of the side edge 24.

In particular, the loudspeaker 40 is arranged completely in the front part of the side edge 24.

The loudspeaker 40 is thus located close to the ears of the occupant 11.

The loudspeaker 40 includes a first diaphragm 44 and an exciter, not shown.

The first diaphragm 44 is arranged in the front wall 36 forming the emission surface. In particular, the front wall 36 defines a cavity opening that is sealed by the first diaphragm 44.

Only the lining element 35 covers the first diaphragm 44. In particular, the loudspeaker 44 comprises a rigid frame 45 defining an opening in which the first diaphragm 44 is arranged.

The rigid frame 45, for example, is made of plastic.

As can be seen in FIGS. 4 and 5, the rigid frame 45 is, for example, screwed to the front wall 36.

The exciter is, notably, an electromagnetic motor that converts electrical energy into mechanical energy.

In particular, the exciter is connected to the first diaphragm 44 and is suitable for directly exciting the first diaphragm 44 in such a way that the first diaphragm 44 vibrates and the air pressure in the cavity varies.

The vibrations of the first diaphragm 44 allow the sound to be diffused into the reception space 33, in front of the support surface 22, i.e., towards the ears of the occupant 11.

The first diaphragm 44 presents a larger dimension comprised between 3 cm and 6 cm.

According to one embodiment, the first diaphragm 44 may be circular in shape, for example. The largest dimension is then the diameter of the first diaphragm 44.

Alternatively, the first diaphragm 44 can be oblong or square, for example.

The first diaphragm 44 presents a first surface S1, for example comprised between 10 $cm^2$ and 30 $cm^2$.

Each passive radiator 42 is separate from the loudspeaker 40.

In the embodiment shown in FIG. 4, the sound diffusion system 26 includes a single passive radiator 42.

Alternatively, the sound diffusion system 26 includes two passive radiators 42.

At least one of the passive radiators 42 is arranged, at least partly, in the front part of the side edge 24.

In particular, at least one of the passive radiators 42 is arranged completely in the front part of the side edge 24.

Notably, the passive radiators 42 are arranged completely in the front part of the side edge 24.

Thus, the passive radiators 42 are arranged close to the ears of the occupant 11.

As can be seen in FIG. 5, the two passive radiators 42 are, for example, arranged on either side of the loudspeaker 40 in the elevation direction Z-Z' perpendicular to the main orientation A-A'.

The passive radiators 42 are offset according to the transverse direction Y-Y' relative to the loudspeaker 40. In particular, the passive radiators 42 are arranged closer to the edge 32 than the loudspeaker 30.

Alternatively, the passive radiators 42 and the loudspeaker 40 are substantially aligned according to the elevation direction Z-Z'.

Alternatively, not shown, the two passive radiators 42 are, for example, arranged on either side of the loudspeaker 40 in the transversal direction Y-Y'.

Each passive radiator 42 is configured to emit low-frequency sound waves to the reception space 33, in front of the support surface 22, i.e., in the direction of the occupant 11. Low-frequency waves are defined as waves presenting a frequency below 200 Hz.

Each passive radiator 42 comprises a second diaphragm 46.

The passive radiator 42 being separate from the loudspeaker 30, the second diaphragm 46 is different from the first diaphragm 44.

Thus, the second diaphragm 44 is arranged at a different opening in the cavity of the emitting surface and sealed by the second diaphragm 46.

In particular, each passive radiator 42 also includes a rigid frame 45, for example, made of plastic, defining an opening in which the second diaphragm 46 is arranged.

As can be seen in FIGS. 4 and 5, the rigid frame 45 is, for example, screwed to the front wall 36.

The second diaphragm 46 is capable of being excited by pressure variations in the cavity due to vibrations of the first diaphragm 44.

Thus, the first diaphragm 44 and the second diaphragm 46 are fluidly connected by the cavity.

The person skilled in the art will therefore understand that the second diaphragm 46 is not attached directly to a related exciter. The vibrations of the second diaphragm 46 are due to the pressure variations caused by the first diaphragm 44 due to the excitation of the latter by the exciter.

In particular, the person skilled in the art will understand that when the cavity contains foam, the pressure variations are also transmitted from the first diaphragm 44 towards the second diaphragm 46.

The second diaphragm 46 has the property of entering into resonance with respect to the excitation frequency of the first diaphragm 44, especially when subjected to low frequency sound waves. Thus, the passive radiator 42 can amplify low-frequency sound waves, especially those presenting a frequency below 200 Hz.

Resonance is the phenomenon whereby certain physical systems are sensitive to particular frequencies. In this case, the second diaphragm 46 is capable of accumulating energy, if it is applied in a periodic form, and close to the frequency known as the "resonance frequency". Subject to such an excitation, the second diaphragm 46 is the seat of increasingly important oscillations.

Each second diaphragm 46 presents a second surface S2A, S2B.

In the embodiments shown in FIGS. 4 and 5, the second diaphragm 46 presents an oblong shape.

Alternatively, the second diaphragm 46 presents a round or square shape.

In order for each passive radiator 42 to diffuse low-frequency sounds efficiently, it is necessary to adjust the dimensions of the second surfaces S2A, S2B to those of the first surface S1.

For this purpose, the ratio between the sum of the second surfaces S2A, S2B and the first surface S1 is advantageously between 1.5 and 2.

This ratio allows the passive radiator 42 to adapt to the dimensions of the loudspeaker 40 and thus enables the efficient diffusion of low-frequency sounds.

Thus, as an example, in the embodiment of FIG. 4 with a single passive radiator 42 and a first circular diaphragm 44, if the first diaphragm 44 presents a diameter of 4 cm, and therefore an area of about 12.5 $cm^2$, the second diaphragm 46 presents a S2 surface area of between 19 $cm^2$ and 25 $cm^2$.

In the embodiment of FIG. 5 with two passive radiators 42 and a first circular diaphragm 44, if the first diaphragm 44 has a diameter of 6 cm, and thus an area of about 28 $cm^2$, the sum of the two areas S2 of the two second diaphragms 46 is comprised between 42 $cm^2$ and 56 $cm^2$. Here for example, the two second diaphragms 46 present substantially the same surface area and therefore each second surface area S2 is between 21 $cm^2$ and 28 $cm^2$.

It is then conceivable that the embodiments described above have a number of advantages.

Indeed, the presence of the passive radiator 42 in the cavity allows an improved diffusion of sounds in the low frequencies, in particular at a frequency lower than 200 Hz, and makes it possible to compensate for the loss of efficiency of the loudspeaker 40 at these frequencies.

In addition, the second diaphragm 44, as it moves, absorbs energy in the cavity and thus dampens the movement of the first diaphragm 42. The frequency response of the loudspeaker 40 is thus flattened, i.e., the function that shows the sound amplitude as a function of frequency presents fewer peaks and presents substantially a flatter shape. As a result, the risk of deformation of the first diaphragm 42 due to excessive vibration amplitude is greatly reduced. In addition, this reduces the sound distortion of the loudspeaker 40.

The headrest 20 therefore allows sound diffusion with good quality despite the small space available for the cavity.

In addition, the use of a passive radiator 42 avoids the parasitic noise generated by a bass-reflex type implementation.

Finally, the sound diffusion system 60 is arranged in the side edges 24 and diffuses towards the reception space 33, in front of the headrest 20, which allows a sound diffusion as close as possible to the ears of the occupant 11 and thus improves sound perception by the occupant 11.

The invention claimed is:

1. A headrest for a vehicle seat, comprising:
   a support surface intended to receive the head of an occupant, the support surface defining a main orientation substantially perpendicular to the support surface, from the support surface to the exterior of the headrest; and
   at least one side element extending along a lateral edge of the support surface and defining with the support surface a space for receiving the head of the occupant;
   wherein the side element defines a cavity, the headrest comprising a sound diffusion system arranged in the cavity, the sound diffusion system comprising:
   a single loudspeaker configured to emit sound waves outside of the cavity towards the reception space in front of the support surface, the single loudspeaker comprising a first diaphragm and an exciter adapted to directly excite the first diaphragm and to vary the air pressure in the cavity; and
   two passive radiators configured to emit low-frequency sound waves to the outside of the cavity, towards the reception space, in front of the support surface, each of the two passive radiators being distinct from the single loudspeaker and comprising a second diaphragm, the second diaphragm being adapted to be excited by pressure variations in the cavity;
   wherein the first diaphragm has a first surface, and each second diaphragm has a second surface, the ratio between the sum of the second surfaces and the first surface being between 1.5 and 2; and
   wherein the single loudspeaker is the only loudspeaker arranged at the cavity.

2. The headrest according to claim 1, wherein each side element extends towards the front according to the main orientation relative to the support surface.

3. The headrest according to claim 1, wherein the single loudspeaker and/or the two passive radiators are, at least in part, arranged in a front part of the side element, the front part being located in front of the support surface according to the main orientation.

4. The headrest according to claim 1, comprising two side elements extending on either side of the support surface, each side element defining a cavity, the headrest comprising two sound diffusion systems each arranged in one of the cavities.

5. The headrest according to claim 1, wherein the two passive radiators are arranged on either side of the single loudspeaker in a direction of elevation perpendicular to the main orientation.

6. The headrest according to claim 1, wherein the first diaphragm has a dimension of between 3 cm and 6 cm.

7. The headrest according to claim 1, wherein the second diaphragm has an oblong shape.

8. The headrest according to claim 1, wherein each side element is movable relative to the lateral edge of the support surface along which the said side element extends.

9. A vehicle seat comprising at least one headrest according to claim 1.

10. The headrest according to claim 1, wherein the at least one side element is movable in rotation relative to the lateral edge.

* * * * *